(12) United States Patent
Burke (10) Patent No.: US 7,882,436 B2
(45) Date of Patent: Feb. 1, 2011

(54) DISTRIBUTION OF VIDEO DATA

(75) Inventor: Trevor John Burke, Wirral (GB)

(73) Assignee: Trevor Burke Technology Limited, Wirral (GB)

( * ) Notice: Subject to any disclaimer, the term of this patent is extended or adjusted under 35 U.S.C. 154(b) by 997 days.

(21) Appl. No.: 10/873,749

(22) Filed: Jun. 22, 2004

(65) Prior Publication Data

US 2005/0204294 A1    Sep. 15, 2005

(30) Foreign Application Priority Data

Mar. 10, 2004  (GB) ................................. 0405340.1
Apr. 13, 2004  (GB) ................................. 0408124.6

(51) Int. Cl.
*G06F 3/00*    (2006.01)
*G06F 3/048*    (2006.01)

(52) U.S. Cl. ....................... 715/719; 715/720; 715/721; 715/810; 715/825; 715/828

(58) Field of Classification Search ................ 715/810, 715/838, 719–721, 825, 828
See application file for complete search history.

(56) References Cited

U.S. PATENT DOCUMENTS

| | | | |
|---|---|---|---|
| 4,520,404 A | 5/1985 | Von Kohorn | |
| 5,191,645 A | 3/1993 | Carlucci et al. | |
| 5,426,652 A | 6/1995 | Heiman | |
| 5,467,288 A | 11/1995 | Fasciano | |
| 5,517,320 A | 5/1996 | Schuler | |
| 5,537,528 A | 7/1996 | Takahashi et al. | |
| 5,568,275 A | 10/1996 | Norton | |
| 5,574,845 A | 11/1996 | Benson et al. | |
| 5,617,565 A | 4/1997 | Augenbraun | |
| 5,623,589 A * | 4/1997 | Needham et al. | 715/853 |
| 5,659,366 A | 8/1997 | Kerman | |
| 5,684,525 A * | 11/1997 | Klosterman | 725/48 |
| 5,724,472 A | 3/1998 | Abecassis | |

(Continued)

FOREIGN PATENT DOCUMENTS

EP    0705036    4/1996

(Continued)

OTHER PUBLICATIONS

IDEA—Innovations Deserving Exploratory Analysis Programs—Intelligent Transportation System Program—I-Witness Black Box Recorder—Final Report for ITS-IDEA Project 84—Gary and Sophia Rayner, I-Witness Inc., San Diego, CA—Nov. 2001 pp. 1-15.

*Primary Examiner*—Steven B Theriault
(74) *Attorney, Agent, or Firm*—Foley & Lardner LLP (57) ABSTRACT

A method of distributing video data comprising defining a plurality of programme elements, each programme element comprising a video clip taken from said video data. Each programme element is allocated to one of a predetermined plurality of classes, each class having an associated icon. Data representing a plurality of icons is transmitted to a receiver, each icon representing a class to which a respective one of said plurality of programme elements is allocated. User selection data indicative of a user selection of at least one icon is received, and data associated with the or each programme element associated with the user selection data is transmitted to the receiver. A method for generating video data, and a method for presenting video data are also disclosed.

34 Claims, 10 Drawing Sheets

U.S. PATENT DOCUMENTS

| | | | |
|---|---|---|---|
| 5,734,720 A | 3/1998 | Salganicoff | |
| 5,754,258 A | 5/1998 | Hanaya et al. | |
| 5,754,938 A | 5/1998 | Herz | |
| 5,754,939 A | 5/1998 | Herz | |
| 5,758,257 A | 5/1998 | Herz | |
| 5,818,439 A | 10/1998 | Nagasaka | |
| 5,821,945 A | 10/1998 | Yeo | |
| 5,835,087 A | 11/1998 | Herz | |
| 5,852,435 A | 12/1998 | Vigneaux | |
| 5,872,865 A * | 2/1999 | Normile et al. | 382/224 |
| 5,884,056 A * | 3/1999 | Steele | 715/738 |
| 5,898,434 A * | 4/1999 | Small et al. | 715/810 |
| 5,940,073 A | 8/1999 | Klosterman | |
| 5,987,150 A * | 11/1999 | Coppinger | 382/100 |
| 5,995,095 A * | 11/1999 | Ratakonda | 715/255 |
| 5,999,173 A * | 12/1999 | Ubillos | 715/724 |
| 6,005,562 A * | 12/1999 | Shiga et al. | 715/721 |
| 6,020,883 A | 2/2000 | Herz | |
| 6,029,195 A | 2/2000 | Herz | |
| 6,034,678 A * | 3/2000 | Hoarty et al. | 715/721 |
| 6,052,492 A * | 4/2000 | Bruckhaus | 382/284 |
| 6,072,934 A | 6/2000 | Abecassis | |
| 6,072,935 A | 6/2000 | De Witt | |
| 6,088,455 A * | 7/2000 | Logan et al. | 380/200 |
| 6,154,600 A | 11/2000 | Newman | |
| 6,157,411 A * | 12/2000 | Williams et al. | 348/552 |
| 6,192,454 B1 * | 2/2001 | De Vos | 711/154 |
| 6,195,387 B1 | 2/2001 | Moeller et al. | |
| 6,205,582 B1 * | 3/2001 | Hoarty | 725/93 |
| 6,211,869 B1 | 4/2001 | Loveman | |
| 6,249,280 B1 | 6/2001 | Garmon | |
| 6,253,238 B1 * | 6/2001 | Lauder et al. | 709/217 |
| 6,275,989 B1 * | 8/2001 | Broadwin et al. | 725/37 |
| 6,278,446 B1 * | 8/2001 | Liou et al. | 715/700 |
| 6,312,336 B1 * | 11/2001 | Handelman et al. | 463/40 |
| 6,313,822 B1 * | 11/2001 | McKay et al. | 345/698 |
| 6,353,699 B1 | 3/2002 | Schwab | |
| 6,389,340 B1 | 5/2002 | Raynor | |
| 6,393,198 B1 | 5/2002 | Lamacchia | |
| 6,405,371 B1 * | 6/2002 | Oosterhout et al. | 725/39 |
| 6,441,809 B2 | 8/2002 | Kent et al. | |
| 6,446,083 B1 * | 9/2002 | Leight et al. | 707/104.1 |
| 6,460,036 B1 | 10/2002 | Herz | |
| 6,462,754 B1 * | 10/2002 | Chakraborty et al. | 715/723 |
| 6,463,444 B1 * | 10/2002 | Jain et al. | 707/104.1 |
| 6,469,711 B2 | 10/2002 | Foreman et al. | |
| 6,473,903 B2 * | 10/2002 | Balakrishnan et al. | 725/135 |
| 6,477,705 B1 * | 11/2002 | Yuen et al. | 725/41 |
| 6,489,969 B1 | 12/2002 | Garmon | |
| 6,493,688 B1 | 12/2002 | Das et al. | |
| 6,526,215 B2 * | 2/2003 | Hirai et al. | 386/52 |
| 6,538,672 B1 * | 3/2003 | Dobbelaar | 715/810 |
| 6,538,701 B1 * | 3/2003 | Yuen | 348/564 |
| 6,567,980 B1 * | 5/2003 | Jain et al. | 725/61 |
| 6,571,279 B1 | 5/2003 | Herz | |
| 6,580,437 B1 * | 6/2003 | Liou et al. | 715/719 |
| 6,581,070 B1 * | 6/2003 | Gibbon et al. | 707/104.1 |
| 6,584,152 B2 | 6/2003 | Sporer et al. | |
| 6,614,732 B2 | 9/2003 | Nonaka et al. | |
| 6,618,547 B1 | 9/2003 | Peters | |
| 6,618,758 B1 * | 9/2003 | Ubowski | 709/232 |
| 6,628,303 B1 | 9/2003 | Foreman | |
| 6,633,308 B1 * | 10/2003 | Ono et al. | 715/723 |
| 6,637,029 B1 * | 10/2003 | Maissel et al. | 725/46 |
| 6,647,535 B1 * | 11/2003 | Bozdagi et al. | 715/255 |
| 6,664,966 B1 | 12/2003 | Ibrahim | |
| 6,668,377 B1 | 12/2003 | Dunn | |
| 6,670,971 B1 | 12/2003 | Oral | |
| 6,675,384 B1 | 1/2004 | Block | |
| 6,678,002 B2 | 1/2004 | Frink et al. | |
| 6,678,891 B1 * | 1/2004 | Wilcox et al. | 725/42 |
| 6,714,723 B2 | 3/2004 | Abecassis | |
| 6,714,909 B1 * | 3/2004 | Gibbon et al. | 704/246 |
| 6,725,215 B2 | 4/2004 | Yamamoto | |
| 6,728,682 B2 | 4/2004 | Fasciano | |
| 6,766,063 B2 | 7/2004 | Gonsalves | |
| 6,771,317 B2 | 8/2004 | Ellis et al. | |
| 6,810,157 B1 | 10/2004 | Cooper | |
| 6,847,373 B1 | 1/2005 | Gonsalves | |
| 6,871,003 B1 | 3/2005 | Phillips | |
| 6,871,161 B2 | 3/2005 | Laird | |
| 6,898,765 B2 * | 5/2005 | Matthews et al. | 715/815 |
| 6,918,132 B2 * | 7/2005 | Gargi | 725/45 |
| 6,922,844 B1 * | 7/2005 | Arsenault et al. | 725/54 |
| 6,954,900 B2 * | 10/2005 | Yu et al. | 715/723 |
| 6,977,667 B1 * | 12/2005 | Burke | 715/723 |
| 6,993,535 B2 * | 1/2006 | Bolle et al. | 707/104.1 |
| 7,073,128 B2 * | 7/2006 | Lloyd-Jones et al. | 715/720 |
| 7,107,532 B1 * | 9/2006 | Billmaier et al. | 715/720 |
| 7,131,059 B2 * | 10/2006 | Obrador | 715/209 |
| 7,149,974 B2 * | 12/2006 | Girgensohn et al. | 715/723 |
| 7,159,176 B2 * | 1/2007 | Billmaier et al. | 715/720 |
| 7,159,177 B2 * | 1/2007 | Billmaier et al. | 715/720 |
| 7,174,512 B2 * | 2/2007 | Martin et al. | 715/719 |
| 7,184,959 B2 * | 2/2007 | Gibbon et al. | 704/270 |
| 7,200,836 B2 * | 4/2007 | Brodersen et al. | 717/100 |
| 7,222,163 B1 * | 5/2007 | Girouard et al. | 709/219 |
| 2001/0014868 A1 | 8/2001 | Herz | |
| 2001/0030661 A1 * | 10/2001 | Reichardt | 345/721 |
| 2002/0056095 A1 | 5/2002 | Uehara et al. | |
| 2002/0087986 A1 * | 7/2002 | Markel | 725/42 |
| 2002/0090955 A1 | 7/2002 | Nelson et al. | |
| 2002/0097983 A1 | 7/2002 | Wallace et al. | |
| 2002/0105535 A1 | 8/2002 | Wallace et al. | |
| 2002/0108112 A1 | 8/2002 | Wallace et al. | |
| 2002/0154157 A1 * | 10/2002 | Sherr et al. | 345/716 |
| 2002/0170068 A1 | 11/2002 | Rafey et al. | |
| 2002/0175917 A1 * | 11/2002 | Chakravarty et al. | 345/473 |
| 2002/0191950 A1 | 12/2002 | Wang | |
| 2003/0001898 A1 * | 1/2003 | Bernhardson | 345/786 |
| 2003/0001907 A1 * | 1/2003 | Bergsten et al. | 345/853 |
| 2003/0018971 A1 * | 1/2003 | McKenna, Jr. | 725/40 |
| 2003/0018977 A1 * | 1/2003 | McKenna | 725/115 |
| 2003/0046100 A1 | 3/2003 | Yamauchi | |
| 2003/0051238 A1 * | 3/2003 | Barone, Jr. | 725/32 |
| 2003/0084441 A1 * | 5/2003 | Hunt | 725/32 |
| 2003/0088872 A1 | 5/2003 | Maissel et al. | |
| 2003/0095149 A1 * | 5/2003 | Fredriksson et al. | 345/797 |
| 2003/0132971 A1 * | 7/2003 | Billmaier et al. | 345/810 |
| 2003/0149975 A1 | 8/2003 | Eldering | |
| 2003/0169302 A1 * | 9/2003 | Davidsson et al. | 345/810 |
| 2003/0202773 A1 | 10/2003 | Dow et al. | |
| 2004/0008229 A1 * | 1/2004 | Hultcrantz | 345/810 |
| 2004/0008973 A1 | 1/2004 | Marshall | |
| 2004/0010771 A1 | 1/2004 | Wallace | |
| 2004/0010792 A1 | 1/2004 | Wallace | |
| 2004/0010793 A1 | 1/2004 | Wallace | |
| 2004/0010794 A1 | 1/2004 | Acott | |
| 2004/0034869 A1 | 2/2004 | Wallace | |
| 2004/0039648 A1 * | 2/2004 | Candelore et al. | 705/26 |
| 2004/0044724 A1 * | 3/2004 | Bell et al. | 709/203 |
| 2004/0046801 A1 * | 3/2004 | Lin et al. | 345/810 |
| 2004/0070593 A1 * | 4/2004 | Neely et al. | 345/716 |
| 2004/0070594 A1 | 4/2004 | Burke | |
| 2004/0073919 A1 | 4/2004 | Gutta et al. | |
| 2004/0095396 A1 * | 5/2004 | Stavely et al. | 345/838 |
| 2004/0107169 A1 * | 6/2004 | Lowe | 705/59 |
| 2004/0140995 A1 * | 7/2004 | Goldthwaite et al. | 345/716 |
| 2004/0255249 A1 * | 12/2004 | Chang et al. | 715/723 |
| 2004/0268413 A1 * | 12/2004 | Reid et al. | 725/131 |
| 2005/0005241 A1 * | 1/2005 | Hunleth et al. | 715/720 |
| 2005/0012761 A1 * | 1/2005 | Shiomi et al. | 345/660 |
| 2005/0028194 A1 * | 2/2005 | Elenbaas et al. | 725/32 |
| 2005/0039177 A1 | 2/2005 | Burke | |

| | | | | | | |
|---|---|---|---|---|---|---|
| 2005/0063677 A1* | 3/2005 | Kosako et al. ............... 386/106 | EP | 1239672 | | 9/2002 |
| 2005/0076384 A1* | 4/2005 | Upendran et al. ........... 725/109 | EP | 1289292 | | 3/2003 |
| 2005/0114793 A1* | 5/2005 | Jung ......................... 715/839 | EP | 1380918 | | 1/2004 |
| 2005/0144652 A1* | 6/2005 | Burke ........................ 725/135 | EP | 1380942 | | 1/2004 |
| 2005/0149872 A1* | 7/2005 | Fong et al. ................. 715/727 | EP | 1380944 | | 1/2004 |
| 2005/0155067 A1* | 7/2005 | McKenna, Jr. .............. 725/61 | EP | 1380945 | | 1/2004 |
| 2005/0172314 A1* | 8/2005 | Krakora et al. ................ 725/38 | EP | 1381224 | | 1/2004 |
| 2005/0204294 A1* | 9/2005 | Burke ........................ 715/739 | FR | 2837310 | | 9/2003 |
| 2005/0289151 A1* | 12/2005 | Burke ........................ 707/100 | GB | 2375208 | | 11/2002 |
| 2006/0015637 A1* | 1/2006 | Chung ........................ 709/232 | GB | 2377846 | | 1/2003 |
| 2006/0039481 A1* | 2/2006 | Shen et al. ............. 375/240.25 | JP | 7-288759 | | 10/1995 |
| 2006/0085828 A1* | 4/2006 | Dureau et al. ............... 725/100 | JP | 9-182037 | | 7/1997 |
| 2007/0011702 A1* | 1/2007 | Vaysman ..................... 725/45 | JP | 2000-312316 | | 11/2000 |
| 2007/0220580 A1* | 9/2007 | Putterman et al. ........... 725/134 | JP | 2002/185583 | | 6/2002 |
| | | | JP | 2003-283966 | | 10/2003 |
| | FOREIGN PATENT DOCUMENTS | | WO | WO 96/17467 | | 6/1996 |
| | | | WO | WO 96/27958 | | 9/1996 |
| EP | 0796538 | 9/1997 | WO | WO 97/29458 | | 8/1997 |
| EP | 1003304 | 5/2000 | WO | WO 98/37696 | | 8/1998 |
| EP | 1028395 | 8/2000 | WO | WO 99/03275 | * | 1/1999 |
| EP | 1102482 | 5/2001 | WO | WO 00/30350 | | 5/2000 |
| EP | 1148721 | 10/2001 | WO | WO 01/45391 | | 6/2001 |
| EP | 1227417 | 7/2002 | WO | WO2004/012100 A1 | | 2/2004 |
| EP | 1227676 | 7/2002 | | | | |
| EP | 1229547 | 8/2002 | * cited by examiner | | | |

DISTRIBUTION OF VIDEO DATA

CROSS-REFERENCE TO RELATED PATENT APPLICATIONS

Great Britain Priority Application 0405340.1, filed Mar. 10, 2004 including the specification, drawings, claims and abstract, is incorporated herein by reference in its entirety. Great Britain Priority Application 0408124.6, filed Apr. 13, 2004 including the specification, drawings, claims and abstract, is incorporated herein by reference in its entirety.

FIELD OF THE INVENTION

The present invention relates to a method and apparatus for distributing video data. The invention also relates to a method and apparatus for receiving video data, a method and apparatus for presenting video data, and a method and apparatus for generating video data.

BACKGROUND OF THE INVENTION

Video data is currently distributed in a variety of different ways. For example, video data is transmitted in the form of broadcast television programmes which are received by a user and displayed using a television receiver. In recent times, such television programmes have been distributed by means of satellite transmissions and cable lines, in addition to more traditional radio frequency transmissions. Furthermore, it is well known to distribute recorded video data on storage media such as video cassettes and Digital Versatile Disks (DVDs).

Recently, the Internet has increasingly been associated with the distribution of video data. Software to display video data is readily available for conventional personal computers, but many users suffer from problems of bandwidth. For example, users connecting to the Internet via a modem and a dialup connection to an Internet Service Provider experience low data transmission rates, making real-time video very difficult to achieve, with displayed video having artefacts of "jerkiness" which is most disconcerting to a user, and impairs enjoyment of the video data. Similar problems exist when a mobile device such as a mobile telephone or handheld computer is used to access video data. Given these problems, many users download an entire broadcast, and then watch the downloaded broadcast. This is again disadvantageous, because this downloading can typically take many minutes to complete.

Even users using high bandwidth connections (generally known as "broadband" connections) can still encounter problems when high quality video data is involved, with the undesirable effects described above being experienced.

U.S. Pat. No. 6,647,535 (Xerox Corporation) describes a system for creating a storyboard from video data. The storyboard comprises a plurality of still images which are representative or key frames taken from the video data. The selected still images can then be displayed to a user by means of an Internet webpage, and a user can select one of the still images to cause a video clip associated with that image to be downloaded and displayed. Although this proposal provides a way of encapsulating a video clip by means of a relatively small number of still images, it suffers from some disadvantages. For example, using still images taken from the video data will not necessarily provide a meaningful and easily understandable indicator of the programme content of the associated video data.

SUMMARY OF THE INVENTION

It is an object of the present invention to obviate or mitigate at least some of the problems described above.

The present invention provides a method and apparatus for distributing video data. The method comprises defining a plurality of programme elements, each programme element comprising a video clip taken from said video data. Each programme element is allocated to one of a predetermined plurality of classes, each class having an associated icon. Data representing a plurality of icons is transmitted to a receiver, each icon representing a class to which a respective one of said plurality of programme elements is allocated. User selection data indicative of a user selection of at least one icon is received, and video data associated with the or each programme element associated with the user selection data to the receiver.

The invention also provides a method for receiving video data comprising a plurality of programme elements. Each programme element comprises a video clip taken from said video data, and each programme element is allocated to one of a predetermined plurality of classes, each class having an associated icon. The method comprises receiving data representing a plurality of icons, each icon representing a class to which a respective one of said plurality of programme elements is allocated. A user selection is received and user selection data representing said selection is transmitted. Data associated with the or each programme element associated with the user selection data is received.

By defining a plurality of programme elements, and allocating each programme element to a class having an associated icon, a distributed video clip can be represented by a series of icons arranged in temporal order of the associated programme elements in the video data. Using icons associated with predetermined classes provides a method of presenting a user with a structured and easily recognised summary of a video clip, with each icon being easily identifiable.

At least some of said plurality of classes may represent a type of event, a programme element may be allocated to one of the plurality of classes on the basis of an event to which the video clip relates. At least some of said plurality of classes may represent a subjective assessment of the value of programme elements and a programme element may be allocated to one of the plurality of classes on the basis of a subjective assessment of value.

The icons may be arranged in an order corresponding to a temporal order of the programme elements represented by the icons. Transmitting data associated with the or each programme element associated with the user selection data to the receiver may comprise transmitting the or each programme element to the receiver.

At least one of said programme elements may comprise a plurality sub-elements, each sub-element may be allocated to one of a predetermined plurality of sub-classes, and the method may further comprise transmitting a further plurality of icons to the receiver in response to selection of an icon associated with the said at least one programme element, each further icon representing a class to which a respective one of said plurality of sub-elements is allocated. Selection data indicative of a user selection of at least one icon corresponding to one of said sub-elements is received, and data associated with the or each sub-element associated with said selection data is transmitted to the receiver.

The present invention also provides a method of presenting video data. This method comprises displaying a first identifier identifying a stream of video data. The video data comprises a plurality of programme elements, each of which has been allocated to one of a predetermined plurality of classes. First user selection data is received indicating a wish to condense the video data and said first user selection data comprises data indicative of user preferences. The video data is condensed in accordance with the first user selection data, to produce condensed video data. The condensed video data comprises a subset of the plurality of programme elements selected on the basis of the first user selection data. The condensed video data is displayed.

Presenting video data in this way provides a convenient mechanism for a user to extract only content of interest from video data, thereby avoiding the need to view content of little or no interest. For example, if video data is allocated to classes at least partially on the basis of event type, condensed video data can be generated by removing video data associated with a specified event type, or alternatively removing all video data except that associated with the specified event type.

The method of the invention is also useful for extracting highlights from video data. For example, where video data is allocated to classes at least partially on the basis of a subjective value judgement such as interest level, a user can specify that only content of a relatively high interest level is to be viewed. This can be useful where it is desired to view highlights of video data in a shorter time than that occupied by the entire video data.

The invention also provides a method of generating video data. The method comprises storing video data as a plurality of programme elements, each programme element being allocated to one of a predetermined plurality of classes. First input data indicating classes of said predetermined plurality of classes which are of interest to a user is received. Second input data indicating an approximate desired viewing duration is also received. Programme elements are retrieved from said stored programme elements in accordance with said first input data, to generate video data having a viewing duration substantially equal to the desired viewing duration.

Generating video data in this manner allows relatively long duration viewing data to be condensed so as to be viewable within a time available. The condensing can be carried out to include events having a relatively high interest level. A user may specify an ordered list of preferences, indicating a range of desirability of various video data, and video data of relatively high desirability may be included in preference to video data of lower desirability.

It will be appreciated that the method of presenting video data, and the method of generating video data described above can be carried out either locally at a client terminal, or alternatively in a distributed manner whereby the client communicates with a remote server, and it is the remote server which carries out the condensing. The implementation of such distributed embodiments of the invention will be readily apparent to one skilled in the art.

BRIEF DESCRIPTION OF THE DRAWINGS

Embodiments of the present invention will now be described, by way of example, with reference to the accompanying drawings, in which.

DETAILED DESCRIPTION OF THE PREFERRED EMBODIMENTS

Figure 1:
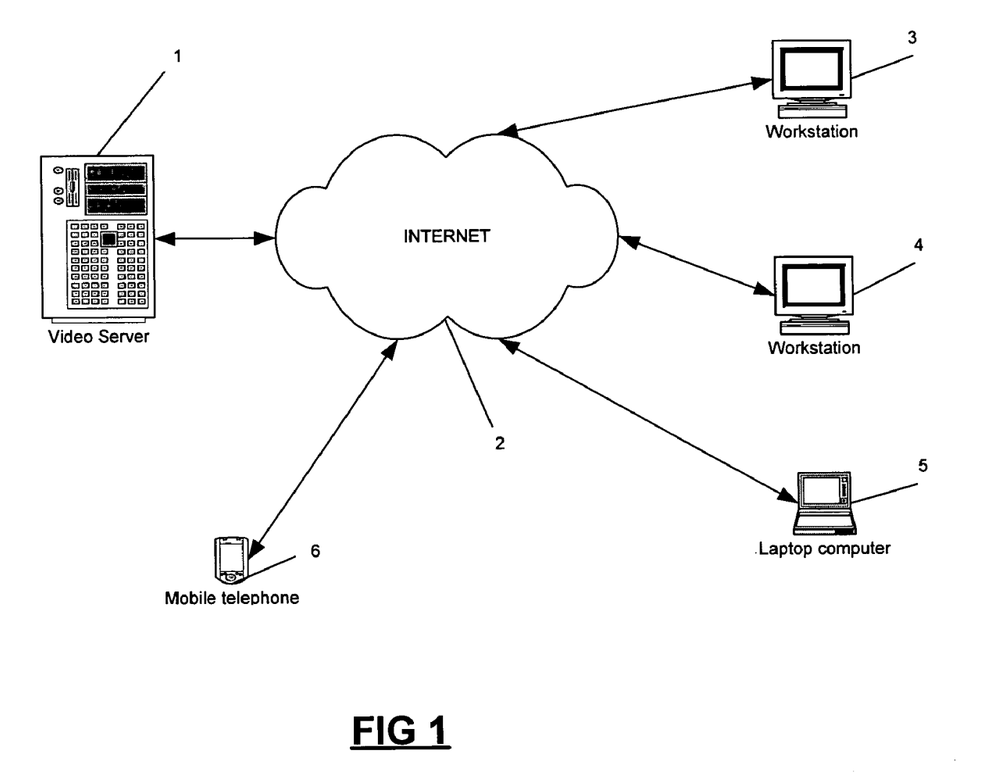
FIG. 1 is a schematic illustration of a computer network suitable for implementing an embodiment of the present invention.

Referring to FIG. 1, there is illustrated a video server 1 connected to the Internet 2. Two workstations 3, 4, a laptop computer 5 and a mobile telephone 6 are also provided with means for connection to the Internet 2. The workstations 3, 4 and the laptop computer 5 can be connected to the Internet 2 via a modem and telephone line (not shown), or alternatively via a connection to a local area network (LAN) which is itself connected to the Internet 2. The mobile telephone 6 can be connected to the Internet 2 either by means of a dialup connection using the Wireless Application Protocol (WAP) or alternatively the mobile telephone 6 can be a third generation mobile telephone with Internet access capability. Indeed each of the user devices 3, 4, 5, 6 can be connected to the Internet 2 in any one of a number of ways which will be readily understood by one of ordinary skill in the art.

A user using the mobile telephone 6 can use web browser software installed on a computer readable storage medium of the mobile telephone to access a web page defined in the HTML language provided by the video server 1. The web page suitably includes options allowing the user of the mobile telephone 6 to view video data stored on the video server 1 using suitable video player software installed on the mobile telephone 6. The video data stored on the video server 1 has, in accordance with an embodiment of the invention, been classified as is now described.

Figure 2:
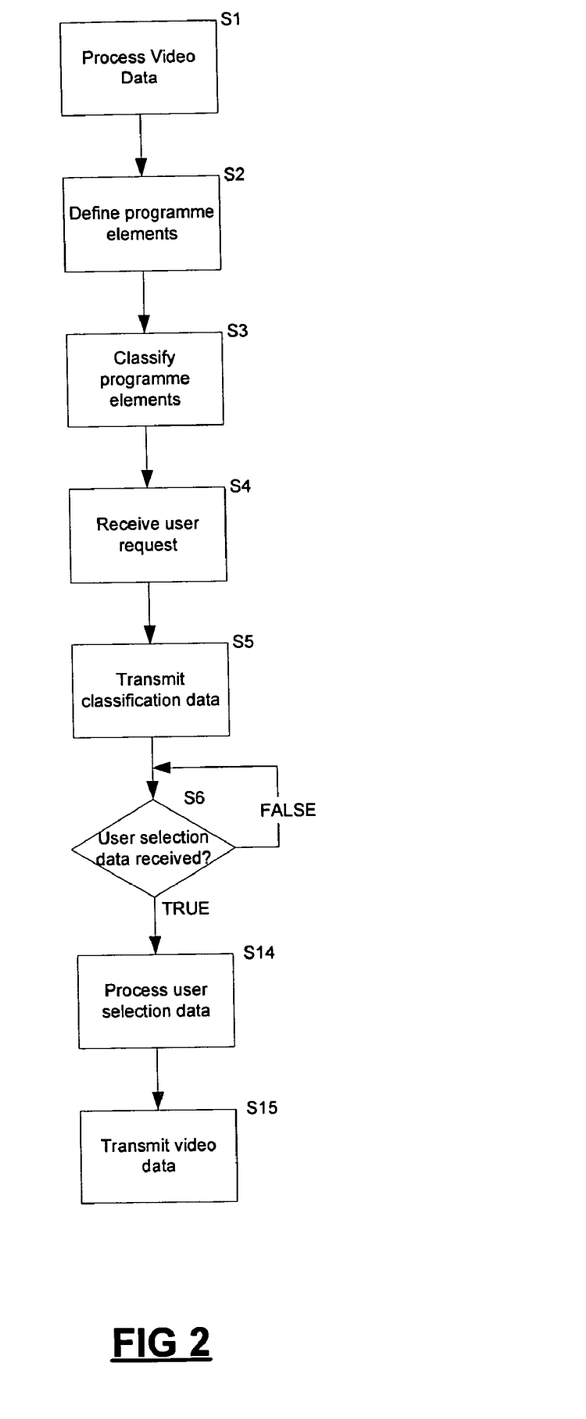
FIG. 2 is a flow chart showing a video classification and distribution process in accordance with an embodiment of the present invention.

FIG. 2 is a flow chart of a classification process for video data which may be carried out by a user of the video server 1. A user processes video data at step S1, and a plurality of programme elements within the video data are defined at step S2, and classified at step S3. Programme elements will typically relate to discrete events within the video data.

Figure 3:
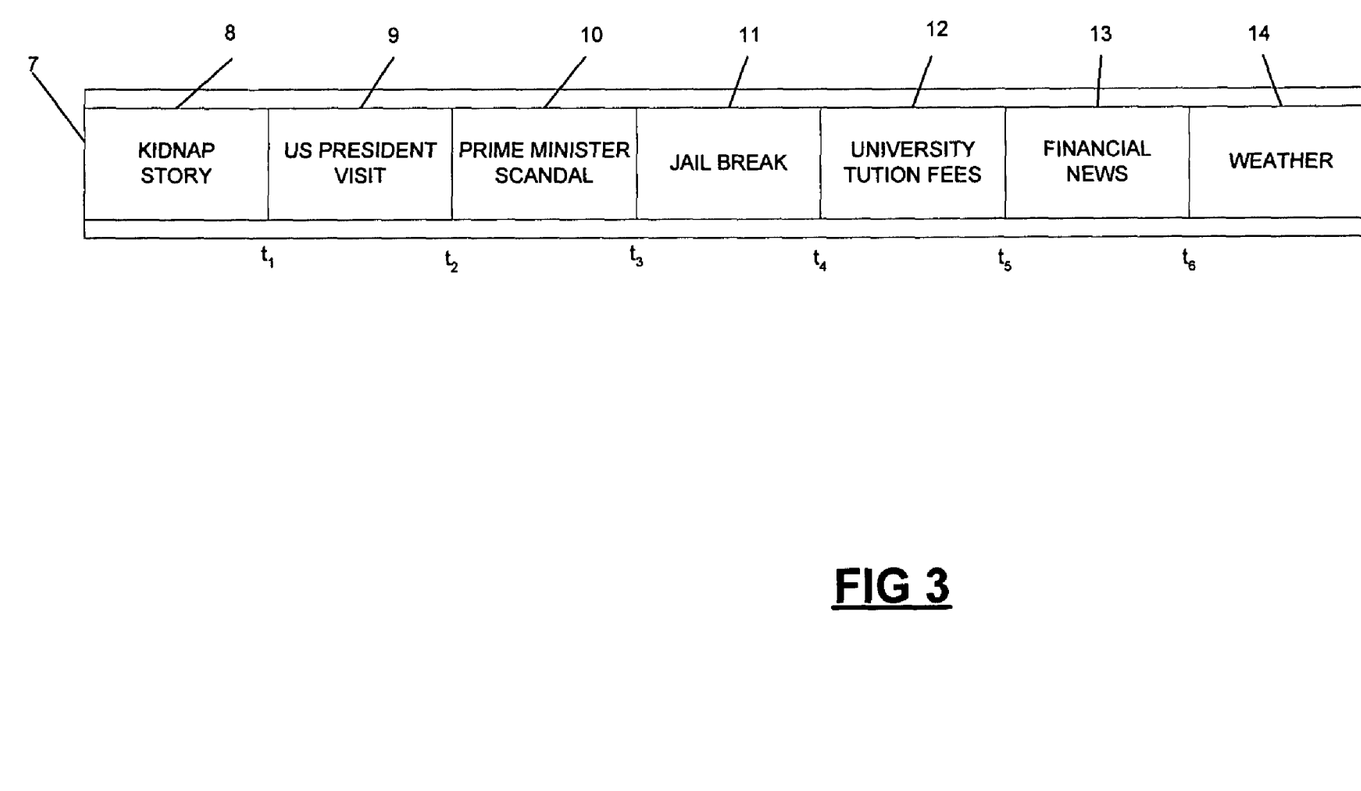
FIG. 3 is a schematic illustration of video data classified using the process of FIG. 2.

Classification of a news programme 7 is illustrated in FIG. 3. The news programme extends from a time t0 to a time t7. Seven discrete programme elements are defined within the news programme 7. A first programme element 8 starts at time t0 (that is the beginning of the news programme 7), continues until time t1 and relates to a kidnap story. A second programme element 9 extends from time t1 and continues until time t2. This programme element relates to a news item describing a US presidential visit. A third programme element 10 begins at the end of the second programme element 9, (that is at time t2), continues until time t3 and relates to a prime ministerial scandal. A fourth programme element 11 relates to a jail break, and extends from time t3 to time t4. A fifth programme element 12 extends from time t4 to time t5 and relates to university tuition fees. A sixth programme element 13 relates to financial news, and extends between time t5 and time t6. A seventh programme element 14 relates to weather news and extends from time t6 to the end of the news programme 7, that is to time t7.

Referring back to FIG. 2, at step S2 an operator places markers at each of times t0 to t7 to delimit the seven described programme elements illustrated in FIG. 3. At step S3 each programme element is allocated to one of a predetermined plurality of classes. In this example these classes relate to content type, and more particularly to the nature of the news story represented by each programme element.

Classification of video data is described in the applicant's published PCT patent application, (publication number WO99/03275) the contents of which are herein incorporated by reference. The applicant's published U.S. patent application (publication No. US2004/0070594 application Ser. No. 10/435,178) also describes methods for classifying and manipulating video data, and its contents are also herein incorporated by reference.

Classification can suitably be carried out by an operator viewing the video data within a graphical user interface (GUI), the GUI providing a plurality of icons which can be selected to effect classification. The user selects a type of programme to be classified (in this case news) and is presented with a plurality of icons which represent programme elements expected to occur within a news programme. The video data is viewed by the operator, and as each new programme element begins, an icon representing the content of that programme element is selected (thus steps S2 and S3 of FIG. 2 could be carried out concurrently). Preferred embodiments of the GUI provide an operator with functionality to offset delays in selecting an appropriate icon, as compared with the true start of a programme element. The published U.S. patent application referred to above describes a suitable GUI.

Figure 4:
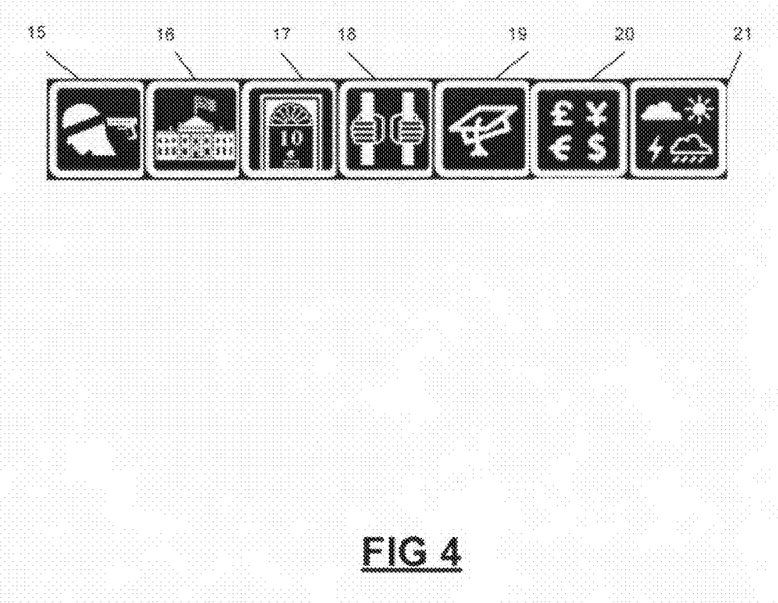
FIG. 4 is an illustration of icons representing the classification illustrated in FIG. 3.

The classification of each programme element described above is denoted by an appropriate icon. FIG. 4 shows a sequence of icons which represent the programme elements making up the news programme 7. A first icon 15 represents the kidnap story programme element 8, a second icon 16 represents the US presidential visit programme element 9, a third icon 17 represents the prime ministerial scandal programme element 10, and a fourth icon 18 represents the jail break programme element 11. A fifth icon 19 represents the university tuition fees programme element 12, a sixth icon 20 represents the financial news programme element 13, and a seventh icon 21 represents the weather programme element 14. It can be seen from FIG. 4 that the sequence of icons provides an easily understandable summary of the content of the video data. Furthermore, over time a user will become readily familiar with the various icons which are used, and will therefore almost instantly know the content type of the associated video data.

Referring back to FIG. 2, having performed appropriate classification, the video server 1 is ready to accept a request from a user via the Internet for the classified video data. Such a request is received at step S4. Classification data representing a class to which each programme element within a requested programme is transmitted to a user at step S5, via the Internet 2. This data takes the form of a plurality of codes, one for each programme element, each code indicating the class to which the respective programme element has been allocated, together with a unique identifier of that programme element. The video server 1 then awaits a response from the user at step S6.

Figure 5:
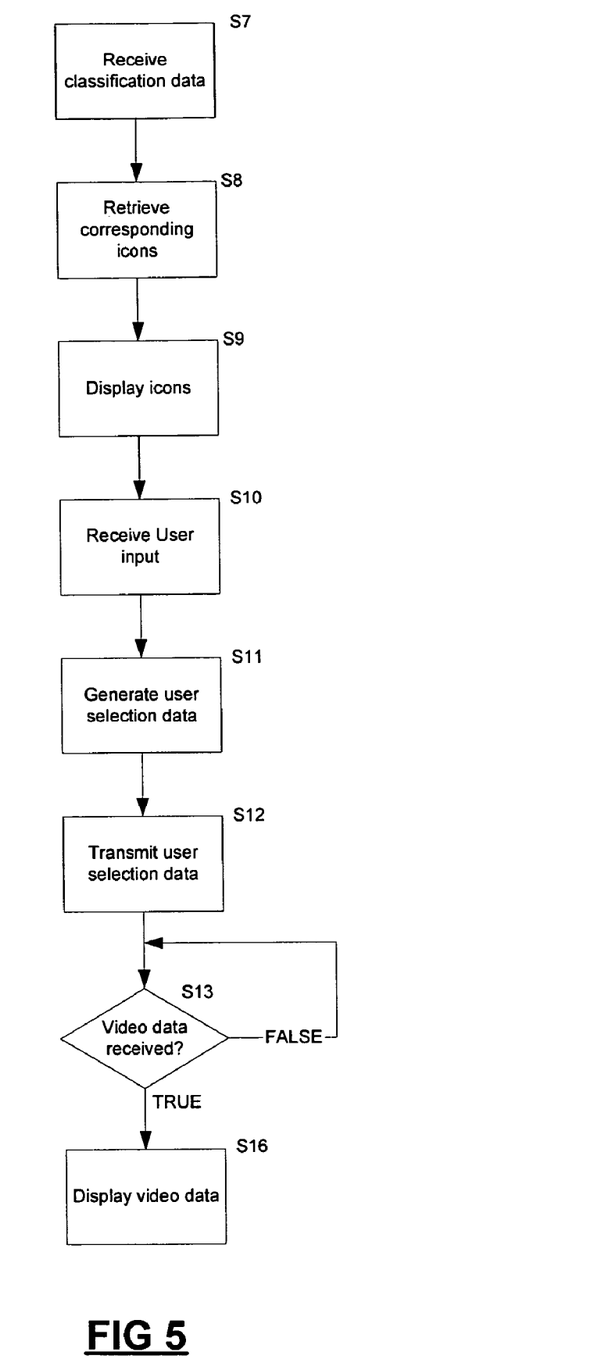
FIG. 5 is a flow chart showing a video receiving and displaying process in accordance with an embodiment of the present invention, which is suitable for using with the classification and distribution process of FIG. 2.
Figure 7:
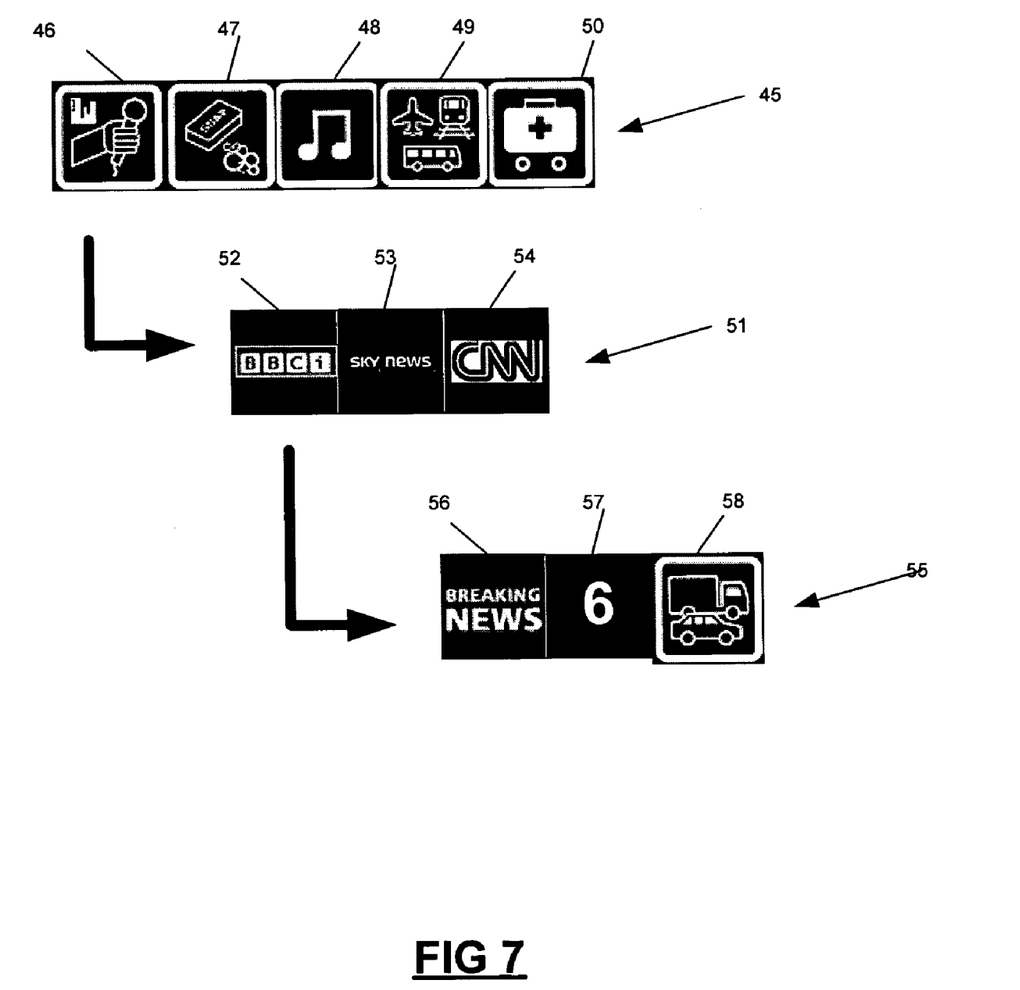
FIG. 7 is an illustration of icons representing a hierarchical classification in accordance with the present invention.

FIG. 7 shows processing carried out by a user device such as the mobile telephone 6 upon receipt of classification data transmitted at step S5 of FIG. 2. At step S7 the classification data is received and stored within the user device. In the described embodiment of the invention each user device stores the plurality of icons used to represent programme element classification. These icons are suitably transmitted to the user device when no other network activity is taking place and stored. The user device processes the classification data received at step S7 and corresponding icons are retrieved from storage at step S8. Thus, if classification codes representing the programme elements of the news programme 7 are transmitted, the sequence of icons illustrated in FIG. 4 will be generated, and these are displayed to the user at step S9 via a suitable display device, which will typically be a monitor in the case of the workstations 3, 4, or a built in screen in the case of the laptop computer 5 and the mobile telephone 6. A user then reviews the sequence of icons and selects one of the icons. This selection can suitably be made by moving a cursor visible on the display device using an input device such as a mouse to cause selection of one of the icons. Alternatively, the icons can be displayed on a touch sensitive screen, and selection can be effected simply by touching the screen, either with a finger, or with a provided touch pen. Indeed, as will be readily apparent to one skilled in the art, any appropriate input device can be used. User input is received at step S10 and user selection data indicative of this input is generated at step S11. This data can suitably simply comprise the unique identifier of the programme element represented by the selected icon, and is transmitted to the video server 1 at step S12. The user device then enters a loop at step S13 until appropriate video data is received from the video Referring back to FIG. 2, on receipt of the user selection data, the loop of step S6 exits, and the received data is processed at step S14. This processing comprises locating video data identified by the unique programme element identifier contained within the user selection data. The located video data is transmitted to the appropriate user device at step S15. The video data is transmitted as one or more video data files in any convenient file format such as MPEG, RealPlayer or QuickTime, for example. Referring back to FIG. 5, receipt of video data causes the loop of step S13 to exit, and the user device can then display the video at step S16 using appropriate video player software. This software can either be a stand alone application, or alternatively can be included within the web browser software used to display the icons for user selection, or included in a web page using, for example, a Java™ Applet. Activation of a suitable standalone video player from a web page and inclusion of a Java™ applet in a web page are well known in the art, and are not described in further detail here.

In the embodiment of the invention described above, it has been assumed that icons are already present on the user device, and are retrieved using classification codes transmitted by the video server 1. In alternative embodiments of the present invention, no icons are stored on a user device in advance, but instead the video server 1 responds to a user request by providing icons together with unique programme element identifiers as described above. Transmission of icons does require slightly greater bandwidth, however this embodiment of the invention makes the described method more widely applicable to devices which do not have stored icons.

Figure 6:
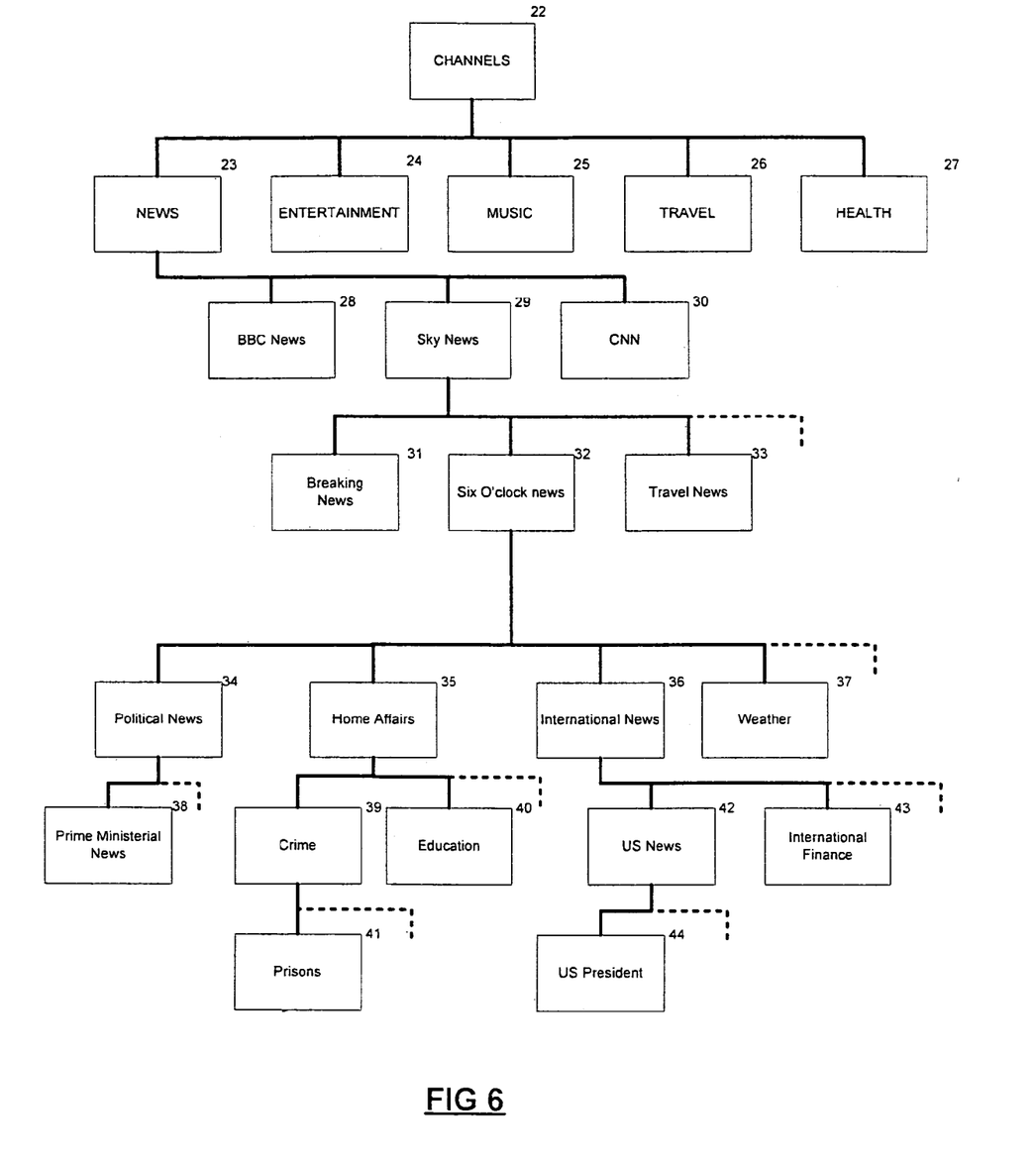
FIG. 6 is a schematic illustration of a class hierarchy which can be used for classification in accordance with an embodiment of the present invention.

FIG. 6 illustrates a hierarchy of classes which can be used for multi-layer classification. In the following description the term "channel" is used to refer to a group of video data items (referred to as programmes) containing programme elements which are provided by a common source. The hierarchy of FIG. 6 has a top level channels class 22 which represents the root of the classification hierarchy. The channels class 22 has five sub-classes which represent channels offering various different content types. A first sub-class 23 is used to represent news channels, a second sub class 24 is used to represent entertainment channels, a third sub-class 25 is used to represent music channels, a fourth sub-class 26 is used to represent travel channels, and a fifth sub-class 27 is used to represent health channels. Each of these sub-classes is used to represent channels of the appropriate type. The News class 23 has sub-classes representing various news channels. A sub-class 28 is used to represent a BBC news channel, a sub-class 29 is used to represent a Sky news channel, and a sub-class 30 is used to represent a CNN news channel.

Each of the sub-classes 28, 29, 30 in turn has sub-classes which represent programmes provided by that channel. FIG. 6 illustrates three subclasses of the sub-class 29 used to represent the Sky news channel, namely a breaking news class 31, a six o'clock news class 32 and a travel news class 33. There are also illustrated subclasses of the six o'clock news class 32 which represent programme elements within that programme. Four sub-classes are illustrated: a political news class 34, a home affairs class 35, an international news class 36 and a weather class 37. Some of these classes have one or more sub-classes. Specifically, the political news class 34 has a prime ministerial news class 38 as a sub-class. The home affairs class 35 has a crime class 39 and an education class 40 as sub-classes. The crime class 39 in turn has a prisons class 41 as a sub-class. The international news class 36 has a US news class 42 and an international finance class 43 as sub-classes. The US news class 42 in turn as a class 44 representing news concerning the US president. The hierarchy of FIG. 6 includes a number of paths indicated in broken lines. This is simply to indicate that further classes are provided at that level of the hierarchy, but these are not described in further detail here.

The hierarchy described with reference to FIG. 6 can be used to classify data using the video server 1. As shown in FIG. 4, this classification can allow video data to be classified using classes at different hierarchical levels (e.g. the education class 40 represented by the icon 19 is at a higher hierarchical level than the prisons class 41 represented by the icon 18).

In the embodiments of the invention described above, a single sequence of icons (FIG. 4) has been described, in which a user selects specific video data, and is provided with a sequence of icons representing programme elements which make up that video data. An alternative embodiment of the invention using the hierarchy of FIG. 6 is now described with reference to FIG. 7. A user is initially provided with a sequence of icons 45 which represent different channel types. An icon 46 represents news channels, an icon 47 represents entertainment channels, an icon 48 represents music channels, an icon 49 represents travel channels, and an icon 50 represents health channels. It can be seen that these icons correspond to similarly named classes in FIG. 6.

On being presented with the sequence of icons 45 a user can make a selection so as to be presented with details of appropriate channels. In the example of FIG. 7 a user selects the news icon 46. This selection is communicated to the video server 1, and in return a further sequence of data is transferred to the user device, for display to the user. This sequence of data is represented by a sequence of icons 51. The sequence of icons 51 comprises a BBC news icon 52, a Sky news icon 53, and a CNN news icon 54. Again a user selection is made and transmitted to the video server 1, data is received from the video server 1, and a further sequence of icons 55 is displayed, representing programmes provided by the selected channel. In this case it was the Sky news icon 53 which was selected, and programmes provided by the Sky news channel are represented by a breaking news icon 56, a six o'clock news icon 57 and a travel news icon 58. A user can select one of the icons 55 to cause display of icons representing programme elements. For example, if the six o'clock news icon 57 is selected, the sequence of icons shown in FIG. 4 is displayed, and user interaction continues in the manner described above.

It should be noted that all embodiments of the invention described above are advantageous, given that summary information is provided to the user in the form of a sequence of icons which can be provided by transmitting minimal data. This summary data can be hierarchical as in the case of FIG. 6 and 7. Video data is transmitted only when specifically requested. Furthermore, given the classification process, only a small quantity of video data of interest to the user is downloaded, meaning that users having low-bandwidth connections make economic use of that bandwidth.

It will be appreciated that he hierarchy of FIG. 6 is merely exemplary, and other hierarchies could be used. For example in some hierarchies there may be no concept of channels as described above. Instead each programme element may be classified with a hierarchy indicating only features of programme element content, regardless of source.

The embodiments of the invention described above have been concerned with classification of programme elements on the basis of programme content. In alternative embodiments of the invention, video data can be divided into programme elements, and each element can be classified on the basis of a subjective value judgment such as an interest level. A programme can then be represented by means of, for example, a sequence of icons, each icon representing an associated interest level by means of a number of stars ranging from zero to five. A user can then simply select one or more icons representing relatively interesting programme elements to cause these to be downloaded in the manner described above. Using icons representing interest level as opposed to content classification may be particularly suitable, for programmes which do not have discrete content based events, but rather contain only a single content type.

Some embodiments of the invention use content based classification as described above, in combination with interest level indicators as described above.

Figure 8:
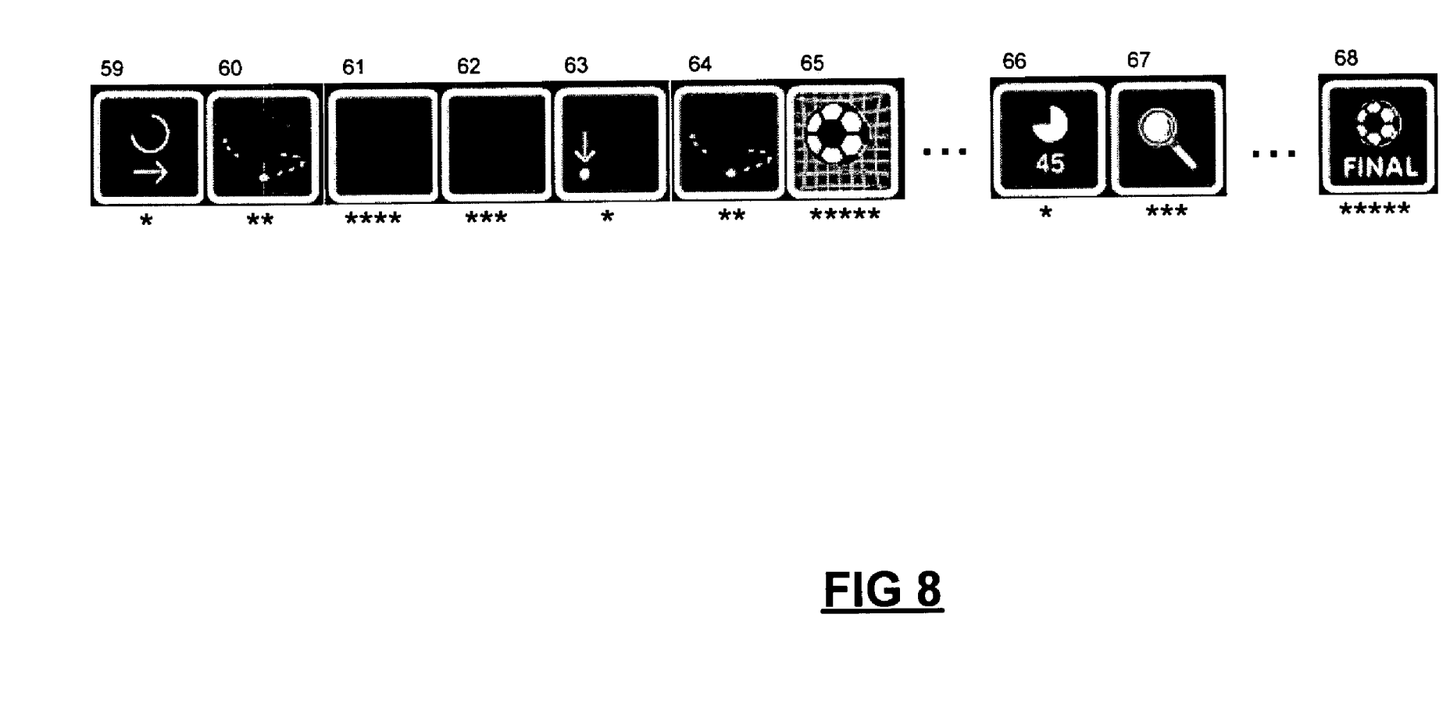
FIG. 8 is an illustration of icons representing a soccer match.

Embodiments of the invention can be used to allow a user to condense a stream of video data such that it can be viewed within a time which a user has available. FIG. 8 illustrates part of a sequence of icons which represent a soccer match. Only part of the sequence of icons representing an entire soccer match is illustrated in FIG. 8, with omitted icons being denoted by ellipsis. It can be seen that the soccer match is represented by a start game icon 59, a dribble icon 60, a defensive action icon 61, an offside icon 62, a free kick icon 63, a further dribble icon 64, and a goal icon 65. Icons representing the remainder of the first half of the soccer match are then omitted. Half time is indicated by a half time icon 66, and half time analysis is indicated by an analysis icon 67. Events making up the majority of the second half are denoted by ellipsis, and a final goal icon 68 denotes the end of the match. It can be seen that in the embodiment of FIG. 8, each icon is presented together with an interest level indicator, denoted by a number of stars below each icon, ranging from one to five.

As described above, the stream of icons of FIG. 8 can be downloaded from the video server to a user's device in advance of the video data itself. A user can then select one or more icons in order to obtain the video content associated with the selected icons.

When the stream of icons partially illustrated in FIG. 8 is displayed to the user, the user may additionally be provided with a viewing duration indicative of the time taken to display the video data represented by all icons. This can be achieved by incorporating with data for each icon a time parameter indicating the viewing duration of the video data represented by that icon. Thus, in the example of FIG. 8, the time for the entire soccer match, together with half time, may be of the order of 110 minutes, and this time may be displayed to the user. It may be however, that a user does not wish to expend that length of time watching an entire soccer match. Therefore, using the icon data downloaded to the user's device, it is possible to specify preferred content, and condense the video data in accordance with the preferred content.

Figure 9:
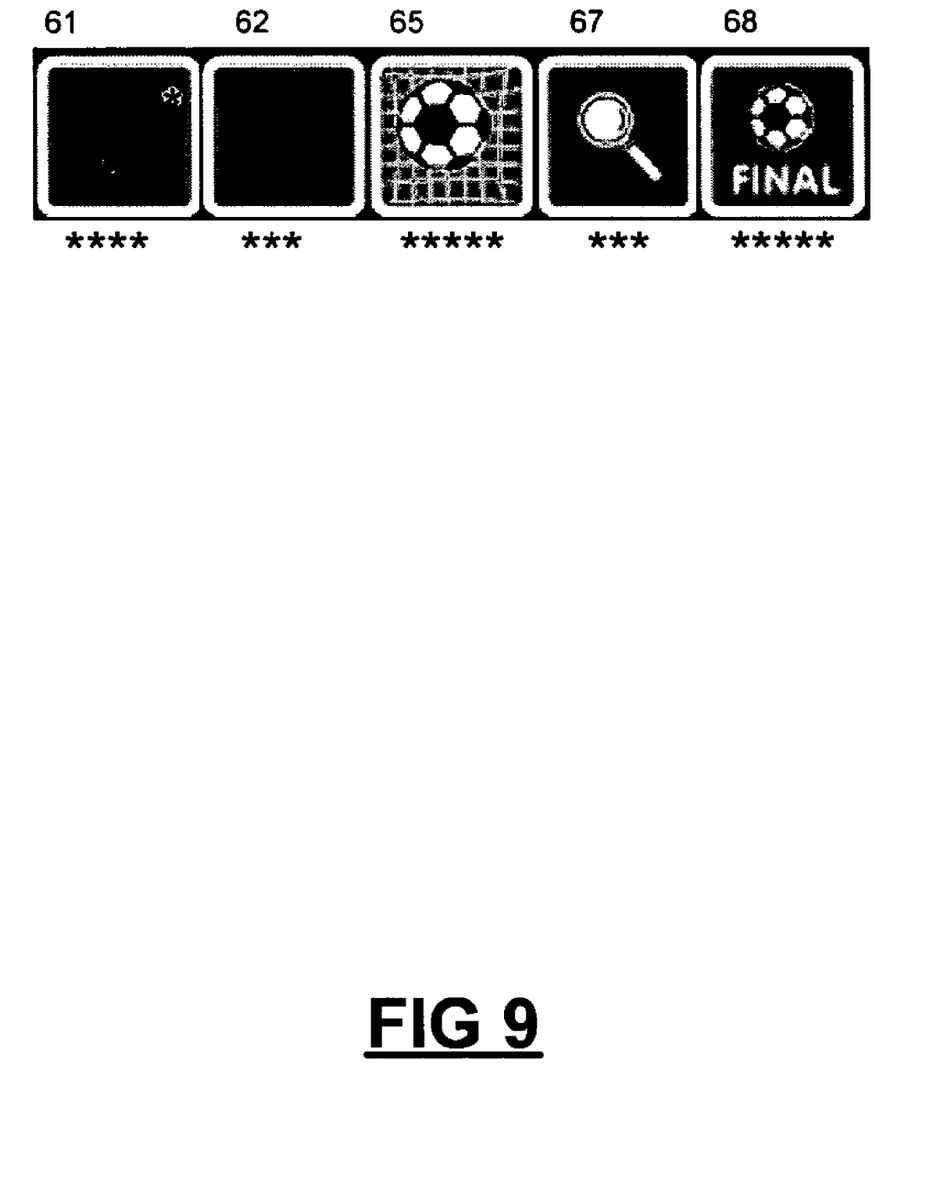
FIG. 9 is an illustration showing a subset of the icons of FIG. 8.

For example, a user may input data indicating that he/she wishes only to view video data which is classified as having an interest level in excess of three stars. On making this selection, a user is then presented with a subset of the icons as illustrated in FIG. 9. Specifically, only the defensive action icon 61, the offside icon 62, the goal icon 65, and the final goal icon 68 are displayed to a user. Again, the user is presented with an indication of the time taken to view all video data associated with these icons. If it is determined that the time indicated to view the video data associated with these icons is acceptable to a user, the user can then request the appropriate video data from the video server and proceed to watch the video data.

The embodiment of the present invention as described above allows a user to download icons which provide an indication of the viewing duration of the associated video data, and then to make a further specification so as to obtain a subset of icons representing a subset of video data and an indication of the (shorter) time that would be required to watch the video data represented by the subset of icons. It will be appreciated, that this embodiment of the invention need not necessarily be used in connection with a subjective value assessment as described above, but instead the sequence of icons illustrated in FIG. 8 could be displayed to a user, the display time would then be determined to be unacceptable, and a user could then specify that only goal events for example, were desired. A subset of sequence of icons representing all goal events, would then be displayed to the user together with the associated viewing duration, and the user could then proceed to watch only the goal video data in the manner described above. Alternatively, the user may specify that it is desired to view only the actual match, not pre-match and half-time discussions and interviews, and the video data could then be condensed to remove, for example, the half-time and analysis programme elements respectively represented by the icons 66, 67 in FIG. 8.

Figure 10:
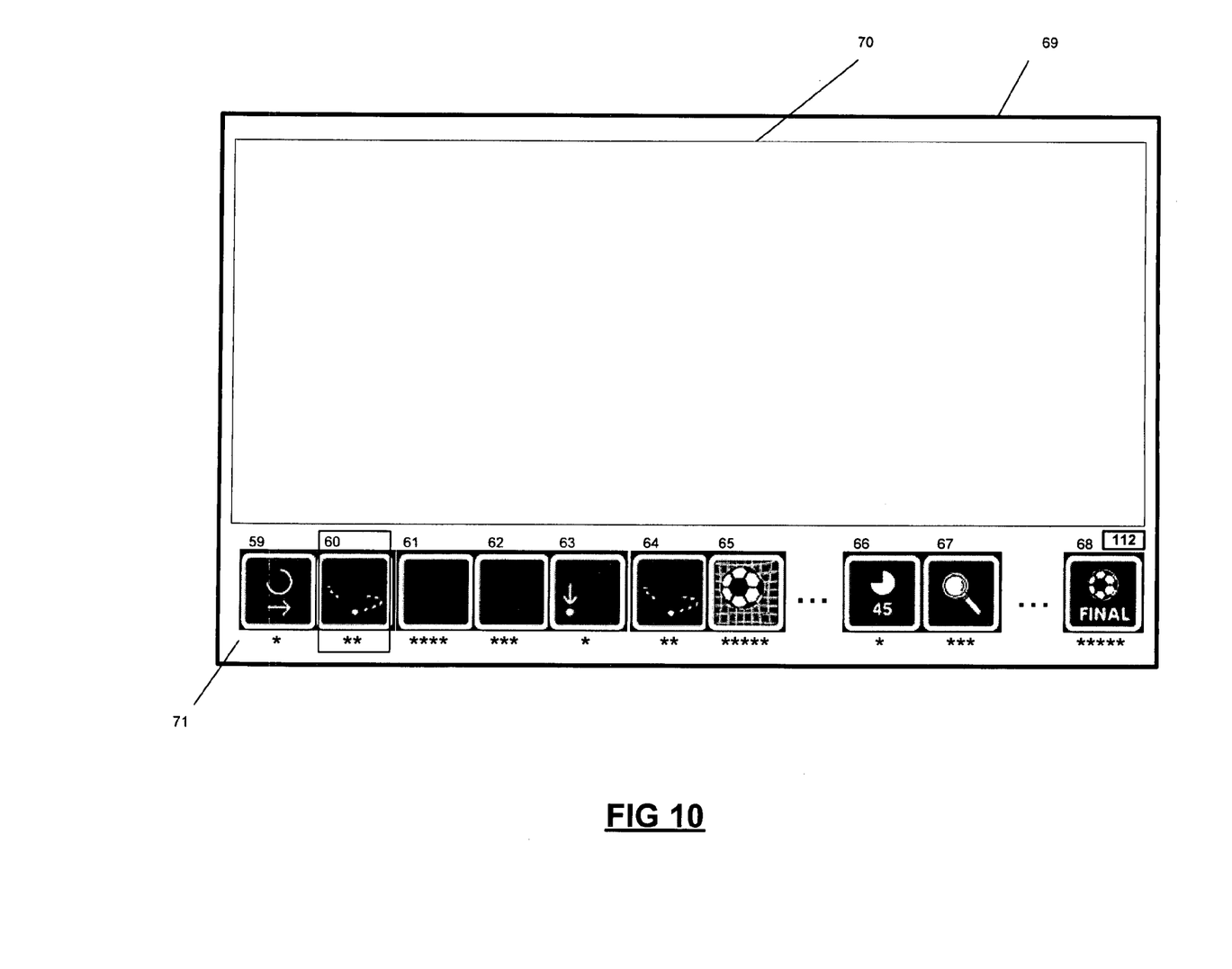
FIG. 10 is an illustration of a display screen which can be used in embodiments of the present invention.

The condensing process described above, is not restricted to applications in which icons are delivered in advance and then used to enable download of video data. For example, as illustrated in FIG. 10, a user may review icons and watch video data concurrently. FIG. 10 illustrates a display screen 69 having a first area 70 in which video data is displayed and a second area 71 in which the stream of icons illustrated in FIG. 8 is displayed. The duration of the video data is indicated in an area 72 of the display screen. Video data is displayed in the area 70, and the icon representative of the data currently being displayed is highlighted in the area 71. In the illustration of FIG. 10, the icon 60 is highlighted. The user may skip backwards and forward within the video data by selecting appropriate icons in the area 71. However, if a user is running short of time and wishes to watch only the highlights of the game, an appropriate selection can be made from, for example, a menu so as to reduce the sequence of icons in the area 71 to, for example, that illustrated in FIG. 9, in the manner described above.

The ability of the invention to condense video data is not restricted to video data represented using icons. For example, a user may be presented with a textual identifier identifying video data together with an estimated viewing duration for the video data. The user can then input data indicative of a wish to condense the video data, this data additionally specifying preferred programme content. In some embodiments the condensed data is then presented directly to the user, whilst in other embodiments, the condensed data is represented to the user by a further identifier, allowing a user to further condense the data prior to viewing.

In an alternative embodiment of the present invention, a user establishes a profile indicative of programme content of interest. The profile may specify a plurality of classes of data in which a user is interested, together indications of interest in each specified class. This user profile can then be used to condense video data as described above. For example, a user may be presented with an identifier or icon sequence representing video data, and then request that the video data is condensed based upon the established profile by, for example, including only classes included within the profile having an interest level above a predetermined threshold.

In some embodiments of the present invention, a user presents details of a desired viewing duration. The video data is then condensed to provide video data having a duration as close as possible to the desired viewing duration. In such embodiments of the invention, a user profile can be used in the manner described above, or alternatively a user can input data indicating how condensing should be carried out.

Although preferred embodiments have been described above, it will be appreciated that various modifications can be made without departing from the spirit and scope of the invention defined by the appended claims.

What is claimed is:

1. A method of distributing video data from a video programme comprising:

inserting data markers within the video data, thereby to define a plurality of programme elements within the video programme, each programme element comprising a video clip;

classifying programme elements with reference to content by allocating the or each programme element to at least one of a predetermined plurality of classes, each class defining a particular genus of content and each class having an associated icon;

transmitting data representing a plurality of the icons from a server to a receiver at a remote client, each icon representing a class to which a respective programme element of the plurality of programme elements is allocated;

receiving user selection data at the server, from the receiver of the remote client, the user selection data indicative of a user selection of at least one icon of the plurality of icons; and transmitting the video clip of the or each programme element corresponding to the user selection data from the server to the receiver of the remote client in response to receiving said user selection data.

2. A method according to claim 1, wherein at least some of said plurality of classes represent a type of event, and the method further comprises:

allocating the or each programme element to one of the plurality of classes on the basis of a type of event to which the video clip relates.

3. A method according to claim 1, wherein at least some of said plurality of classes represent a subjective assessment of the value of programme elements, and the method further comprises:
allocating the or each programme element to at least one of the plurality of classes on the basis of a subjective assessment of value.

4. A method according to claim 1, further comprising:
arranging said plurality of icons in an order corresponding to a temporal order of the programme elements represented by the icons.

5. A method according to claim 1, wherein transmitting the video clip comprises transmitting the or each corresponding programme element from the server to the receiver of the remote client.

6. A method according to claim 1, wherein at least one of said programme elements comprises a plurality sub-elements, each sub-element is allocated to at least one of a predetermined plurality of sub-classes, and the method further comprises:
transmitting a further plurality of icons from the server to the receiver of the remote client in response to selection of an icon associated with the said at least one programme element, each further icon representing a class to which a respective one of said plurality of sub-elements is allocated;
receiving at the server, from the receiver of the remote client, selection data indicative of a user selection of at least one said further icon corresponding to one of said sub-elements; and
transmitting data associated with the or each sub-element associated with said selection data from the server to the receiver of the remote client.

7. A computer readable storage medium including computer readable instructions to cause a computer to carry out a method according to claim 1.

8. A method according to claim 7, wherein the computer readable storage medium comprises a computer readable storage medium for a mobile phone.

9. An apparatus for distributing video data comprising:
a computer readable storage medium including processor readable instructions; and
a processor for reading and executing instructions included in the computer readable storage medium;
wherein said processor readable instructions comprise instructions controlling the processor to carry out the method of claim 1.

10. A method according to claim 1, wherein the video clip is transmitted from the server to the receiver of the remote client only in an event where the icon associated with the programme element associated with the video clip is selected.

11. A method according to claim 1, wherein the user selection data is received from the receiver of the remote client before the video clip is transmitted by the server to the receiver of the remote client.

12. A method according to claim 1, wherein transmitting further comprises transmitting programme elements having a total viewing duration based on a predetermined viewing duration as selected by the user.

13. A method according to claim 1, wherein the video clip of the or each programme element corresponding to the user selection data is transmitted from the server to the receiver of the remote client in its entirety in response to receiving said user selection data.

14. A method according to claim 1, wherein transmitting the video clip comprises causing the receiver of the remote client to display the video clip.

15. A method according to claim 1, wherein receiving user selection data comprises receiving, at the server, a request from the receiver of the remote client for the video clip corresponding to the selected icon of the plurality of icons.

16. A method according to claim 15, wherein transmitting the video clip comprises transmitting the video clip from the server to the receiver of the remote client in response to the request.

17. A method according to claim 16, wherein transmitting the video clip comprises not transmitting the video clip from the server to the receiver of the remote client unless the request is received.

18. A method according to claim 1, wherein the video clip is transmitted over the interne from the server to the receiver of the remote client in response to the selected icon.

19. A method of receiving video data from a video programme comprising a plurality of programme elements, the video data having data markers to define the plurality of programme elements within the video programme, each programme element comprising a video clip, and each programme element being classified with reference to content by allocating the or each programme element to at least one of a predetermined plurality of classes, each class defining a particular genus of content and each class having an associated icon, the method comprising:
receiving data at a receiver of a local client, from a remote server, the data representing a plurality of the icons, each icon representing a class to which a respective one of said plurality of programme elements is allocated;
receiving a user selection of at least one, icon of the plurality of icons;
transmitting user selection data representing said user selection from the receiver of the local client to the remote server; and
receiving at the receiver of the local client, from the remote server, the video clip of the or each programme element corresponding to the user selection data in response to said transmitted user selection data.

20. A method according to claim 19, wherein at least some of said plurality of classes represent a type of event, and the or each programme element is allocated to at least one of the plurality of classes on the basis of the type of event to which the video clip relates.

21. A method according to claim 19, wherein at least some of said plurality of classes represent a subjective assessment of the value of programme elements, and the or each programme element is allocated to at least one of the plurality of classes on the basis of a subjective assessment of value.

22. A method according to claim 19, further comprising:
arranging said plurality of icons in an order corresponding to the temporal order of the programme elements represented by the icons.

23. A method according to claim 19, wherein receiving data comprises receiving the or each corresponding programme element.

24. A method according to claim 19, wherein at least one of said programme elements comprises a plurality of sub-elements, each sub-element is allocated to at least one of a predetermined plurality of sub-classes, and receiving data comprises:
receiving a plurality of further icons at the receiver of the local client, from the remote server, in response to selection of an icon associated with said at least one programme element, each icon representing a class to which a respective one of said plurality of sub-elements is allocated;

receiving a user selection of at least one said further icon corresponding to one of said sub-elements;

transmitting selection data indicating the user selection from the receiver of the local client to the remote server; and receiving data at the receiver of the local client, from the remote server, the data associated with the or each sub-element associated with said user selection.

25. A method according to claim 19, wherein receiving data representing a plurality of the icons comprises:

receiving a plurality of classification codes, each classification code being associated with an icon of the plurality of the icons; and retrieving icons associated with said plurality of classification codes from a memory of the receiver of the local client.

26. A computer readable storage medium including computer readable instructions to cause a computer to carry out a method according to claim 19.

27. An apparatus for distributing video data comprising:

a computer readable storage medium including processor readable instructions; and a processor for reading and executing instructions included in the computer readable storage medium;

wherein said processor readable instructions comprise instructions controlling the processor to carry out the method of claim 19.

28. Video data distributing apparatus for distributing video data from a video programme comprising:

a processor configured to generate data inserting data markers within the video data to define a plurality of programme elements within the video programme, each programme element comprising a video clip, and to generate data classifying programme elements with reference to content by allocating the or each programme element to at least one of a predetermined plurality of classes, each class defining a particular genus of content and each class having an associated icon;

a server comprising:

a transmitter configured to transmit data representing a plurality of the icons from the server to a receiver at a remote client, each icon representing a class to which a respective one of said plurality of programme elements is allocated; and a local receiver configured to receive user selection data, from the receiver of the remote client, indicative of a user selection of at least one icon of the plurality of icons;

wherein said transmitter is configured to transmit the video clip of the or each programme element corresponding to the user selection data from the server to the receiver at the remote client in response to said received user selection data.

29. Apparatus according to claim 28, wherein said processor is configured to generate data arranging icons in an order corresponding to a temporal order of the programme elements represented by the icons.

30. Apparatus according to claim 28, wherein said transmitter is configured to transmit the or each programme element to the receiver of the remote client.

31. Video data receiving apparatus for receiving video data from a video programme, the apparatus for receiving a plurality of programme elements within the video programme, each programme element comprising a video clip, and each programme element being classified with reference to content to be allocated to at least one of a predetermined plurality of classes, each class defining a particular genus of content and each class having an associated icon, the apparatus comprising:

a local client comprising:

a receiver configured to receive data representing a plurality of icons from a remote server, each icon representing a class to which a respective one of said plurality of programme elements is allocated;

an input device configured to receive a user selection of at least one icon of the plurality of icons; and a transmitter configured to transmit, to the remote server, user selection data representing said user selection from the receiver of the local client;

wherein the receiver is configured to receive the video clip of the or each programme element corresponding to the user selection data from the remote server in response to said transmitted user selection data.

32. Apparatus according claim 31, wherein said receiver is configured to receive said plurality of icons from the remote server.

33. Apparatus according to claim 32, wherein said receiver is adapted to:

receive a plurality of classification codes from the remote server, each classification code being associated with an icon; and retrieve icons associated with said plurality of classification codes from a memory of the local client.

34. A method of distributing video data comprising:

defining a plurality of programme elements, each programme element comprising a video clip taken from said video data;

allocating each programme element to one of a predetermined plurality of classes, each class having an associated icon;

transmitting data representing a plurality of the icons from a server to a receiver at a remote client, each icon representing a class to which a respective one of said plurality of programme elements is allocated;

receiving at the server, from the receiver of the remote client, user selection data indicative of a user selection of at least one icon of the plurality of the icons; and transmitting from the receiver of the remote client to the server, the video clip of the or each programme element with corresponding to the user selection data to the receiver of the remote client in response to receiving said user selection data.

\* \* \* \* \*